US009703809B2

(12) United States Patent
Gregor (10) Patent No.: US 9,703,809 B2
(45) Date of Patent: Jul. 11, 2017

(54) METHOD AND APPARATUS FOR ANALYZING DATA IN SUBSEQUENT GEOPHYSICAL SURVEYS

(75) Inventor: John Gregor, Edinburgh (GB)

(73) Assignee: ION Geophysical Corporation, Houston, TX (US)

( * ) Notice: Subject to any disclaimer, the term of this patent is extended or adjusted under 35 U.S.C. 154(b) by 193 days.

(21) Appl. No.: 14/006,646

(22) PCT Filed: Aug. 1, 2011

(86) PCT No.: PCT/US2011/046081
§ 371 (c)(1),
(2), (4) Date: Sep. 20, 2013

(87) PCT Pub. No.: WO2012/128784
PCT Pub. Date: Sep. 27, 2012

(65) Prior Publication Data
US 2014/0019465 A1    Jan. 16, 2014

Related U.S. Application Data

(60) Provisional application No. 61/466,620, filed on Mar. 23, 2011.

(51) Int. Cl.
*G06F 17/30* (2006.01)
*G01V 1/30* (2006.01)

(52) U.S. Cl.
CPC .......... *G06F 17/30289* (2013.01); *G01V 1/30* (2013.01)

(58) Field of Classification Search
CPC ............................ G06F 17/30299; G01V 1/30
(Continued)

(56) References Cited

U.S. PATENT DOCUMENTS 5,873,051 A      2/1999   Van Bemmel
2002/0122351 A1*  9/2002   Hardage ................ G01V 1/053
                                                    367/13
(Continued)

FOREIGN PATENT DOCUMENTS

CN    101614826 A    12/2009
GB       2317451 A     3/1998
(Continued)

OTHER PUBLICATIONS

European Patent Office, "International Search Report and Written Opinion of the International Searching Authority"; PCT/US2011/046086; Jul. 20, 2012; 10 pp.
(Continued)

*Primary Examiner* — Thu-Nguyet Le
(74) *Attorney, Agent, or Firm* — Dorsey & Whitney LLP (57) ABSTRACT

Methods and apparatuses are disclosed that assist in correlating subsequent geophysical surveys. In some embodiments, geophysical data may be generated including a first set of data from a monitor survey that is matched with a second set of data from a baseline survey. An attribute value may be generated for each datum in the first set of data, and the generated attribute value may be associated with the datum from the first set of data and at least one of a plurality of bins. In some embodiments, the attribute values may be based upon the geometric closeness of sources and receivers in the baseline and monitor surveys.

19 Claims, 9 Drawing Sheets

(58) Field of Classification Search
USPC .......................................... 707/758; 367/38
See application file for complete search history.

(56) References Cited

U.S. PATENT DOCUMENTS

| | | | |
|---|---|---|---|
| 2005/0038604 A1 | 2/2005 | Marin et al. | |
| 2005/0073910 A1 | 4/2005 | Cole et al. | |
| 2005/0086006 A1 | 4/2005 | Favret et al. | |
| 2008/0080309 A1 | 4/2008 | Elkington et al. | |
| 2008/0170468 A1* | 7/2008 | Brain ..................... | G01V 1/301 367/38 |
| 2008/0189043 A1 | 8/2008 | Anno et al. | |
| 2009/0096457 A1* | 4/2009 | Srnka ..................... | G01V 3/12 324/334 |
| 2009/0122640 A1 | 5/2009 | Hill et al. | |
| 2009/0290449 A1 | 11/2009 | Smith et al. | |
| 2010/0002538 A1* | 1/2010 | Frivik ................... | G01V 1/3835 367/19 |
| 2010/0118650 A1* | 5/2010 | Eick ...................... | G01V 1/24 367/38 |
| 2011/0038228 A1 | 2/2011 | Ligtendag et al. | |

FOREIGN PATENT DOCUMENTS

| | | |
|---|---|---|
| GB | 2420408 A | 5/2006 |
| WO | 98/11455 | 3/1998 |
| WO | 2010/054282 A1 | 5/2010 |
| WO | 2010054282 A1 | 5/2010 |

OTHER PUBLICATIONS

Keith Watt; "A New QC approach for 4D seismic surveys using towed streamer acquisition"; First Break vol. 26; May 2008; pp. 61-66.

X.-P Li, E. Hodges, M. Widmaier, E. Sundvor, & S. Eidsvig; "Seismic repeatability analysis from Oseberg 4D processing—a case history"; EAGE 66th Conference & Exhibition; Jun. 7-10, 2004; 4 pp.; Paris, France.

European Patent Office; "International Search Report and Written Opinion of the International Searching Authority"; PCT/US2011/046081; Dec. 27, 2011; 15 pp.

"Search Report issued by State Intellectual Property Office of People's Republic China", on Sep. 24, 2015, in Chinese Application No. 201180071043.3, 3 pages.

Ion Marine Imaging Systems, , "Reflex Comprehensive Binning and Attribute Analysis", Obtained at url: http://www.iongeo.com/Resource_Center/Brochures_and_Data_Sheets/Data_Sheets/, 2011, 4 Pages.

Search Report issued in Chinese Application No. 201180071062.6 on Oct. 22, 2015, 2 pp.

Meihou, Yun et al., "Study and primary application on consistency processing of seismic data", Geophysical Prospecting for Petroleum. Jan. 2006 vol. 45 (1): 65-69, only Abstract translated.

Xiaohong, Chen "Normalization for Four-Dimensional Seismic Data and its Application to Real Data", Acta Petrolei Sinca. Nov. 1999 vol. 20 (6): 22-26, only Abstract translated.

Chinese Office Action, issued for CN 201180071062.6, issued on Oct. 29, 2005, 23 pages.

Chinese Office Action, issued for CN 201180071043.3, mailed on Jul. 14, 2016, 17 pages.

Second Office Action issued Aug. 25, 2016 in connection with Chinese Application No. 201180071062.6, 22 pages, English translation included.

Huifeng, Li , "New Technologies on Seismic Exploration", Petroleum Industry Press,, Dec. 31, 2009, 203-217.

Search Report issued in Chinese Application No. 201180071062.6 on Oct. 22, 2015, 2 pp. (translation, citing Huifeng, Li).

Third Office Action dated Nov. 25, 2016 in connection with Chinese Patent Application No. 201180071062.6 with English translation, 23 pages.

Final Office Action dated Mar. 7, 2017 received in connection with U.S. Appl. No. 14/006,627, 50 pages.

Third Office Action dated Mar. 9, 2017 received in connection with Chinese Patent Application No. 201180071043.3, 29 pages.

Communication pursuant to Article 94(3) dated May 11, 2017 in connection with European Patent Application No. 11741397.1, 6 pages.

* cited by examiner

METHOD AND APPARATUS FOR ANALYZING DATA IN SUBSEQUENT GEOPHYSICAL SURVEYS

This patent application claims priority to and the benefit of PCT Application No. PCT/US2011/046081 entitled "METHOD AND APPARATUS FOR ANALYZING DATA IN SUBSEQUENT GEOPHYSICAL SURVEYS filed on Aug. 1, 2011, and also claims priority to and the benefit of U.S. provisional application No. 61/466,620, entitled "Method and apparatus for analyzing data in subsequent geophysical surveys" filed on Mar. 23, 2011, both of which are incorporated herein by reference in their respective entireties.

TECHNICAL FIELD

This disclosure relates generally to geophysical exploration systems, and more particularly to data acquisition and analysis in subsequent geophysical surveys.

BACKGROUND

Petrochemical products such as oil and gas, are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with a receiver (e.g., a geophone, a hydrophone, etc.). By observing the reflected seismic signals detected by the receiver during the survey, the geophysical data pertaining to reflected signals may be acquired and these signals may indicate the composition of the Earth proximate the survey location.

As portions of the oil and gas are removed from the reservoir, a follow-up, or monitor survey may be taken near the same location as the original, baseline survey. Oftentimes, the data that the monitor survey provides is called 4D data, because it provides a fourth dimension to the data being collected—time. For example, this 4D survey may allow scientists and engineers to see how much oil or gas has been removed from the reservoir, how much oil or gas remains in the reservoir, and/or how the oil or gas has moved within the reservoir since the baseline survey. In cases where the sources and receivers for the baseline survey are installed on land or on the surface of the ocean floor and not removed between surveys, the monitor survey may involve firing the sources and recording the reflected seismic signals at the receivers. In other cases, such as where the surveys are conducted using streamers towed behind a vessel, or using transient sources and receivers on land, some system of quality control may be established to facilitate coordinating data sets between the two surveys.

"Repeatability" is a term used to refer to the measure of how closely the monitor survey correlates to the baseline survey. There are several different forms of repeatability. For example, positional or geometric repeatability is a measure of how positionally or geometrically close a monitor survey's data is to a baseline survey's data. Even if the geometric repeatability of a monitor survey is good (for example, where sources and receivers are installed permanently on land or on the ocean floor), other factors may decrease the repeatability, and therefore the reliability, of the data obtained in the monitor survey. A few aspects of a survey that may be of concern in terms of repeatability include: source position, receiver position, the common mid-point (CMP) position between the source and the receiver, offset or radial distance between the source and the receiver, azimuth, and components and combinations of these. In order to accurately determine the amount of oil or gas removed from a reservoir, scientists and engineers may need to know how closely the monitor survey correlates to one or more aspects of the baseline survey.

SUMMARY

One method for processing geophysical data includes correlating a first set of data from a first survey with a second set of data from a second survey and generating an attribute value for each datum in the first set. It also may include associating each datum within the first set of data with the generated attribute value and at least one of a plurality of bins.

A tangible storage medium may store a plurality of instructions, including instructions correlating a first set of data from a first survey with a second set of data from a second survey, instructions generating an attribute value for each datum in the first set, and instructions associating each datum within the first set of data with the generated attribute value and at least one of a plurality of bins.

A tangible storage medium may store data including a first set of data from a first survey and an attribute value for each datum in the first set of data. Each attribute value may represent a difference between a datum from the first set of data and a datum from a second set of data from a second survey.

DETAILED DESCRIPTION

Petrochemical products such as oil and gas, are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with a receiver (e.g., a geophone, a hydrophone, etc.). By observing the reflected seismic signals detected by the receiver during the survey, the geophysical data pertaining to reflected signals may be acquired and these signals may indicate the composition of the Earth proximate the survey location.

As portions of the oil and gas are removed from the reservoir, a follow-up, or monitor survey may be taken near the same location as the original, baseline survey. Oftentimes, the data that the monitor survey provides is called 4D data, because it provides a fourth dimension to the data being collected—time. For example, this 4D survey may allow scientists and engineers to see how much oil or gas has been removed from the reservoir, how much oil or gas remains in the reservoir, and/or how the oil or gas has moved within the reservoir since the baseline survey. In cases where the sources and receivers for the baseline survey are installed on land or on the surface of the ocean floor and not removed between surveys, the monitor survey may involve firing the sources and recording the reflected seismic signals at the receivers. In other cases, such as where the surveys are conducted using streamers towed behind a vessel, or using transient sources and receivers on land, some system of quality control may be established to facilitate coordinating data sets between the two surveys.

"Repeatability" is a term used to refer to the measure of how closely the monitor survey correlates to the baseline survey. There are several different forms of repeatability. For example, positional or geometric repeatability is a measure of how positionally or geometrically close a monitor survey's data is to a baseline survey's data. Even if the geometric repeatability of a monitor survey is good (for example, where sources and receivers are installed permanently on land or on the ocean floor), other factors may decrease the repeatability, and therefore the reliability, of the data obtained in the monitor survey. A few aspects of a survey that may be of concern in terms of repeatability include: source position, receiver position, the common mid-point (CMP) position between the source and the receiver, offset or radial distance between the source and the receiver, azimuth, and components and combinations of these. In order to accurately determine the amount of oil or gas removed from a reservoir, scientists and engineers may need to know how closely the monitor survey correlates to one or more aspects of the baseline survey. Accordingly, systems and methods are disclosed that provide scientists and engineers the ability to analyze monitor survey geophysical data and monitor survey coverage that have been filtered based on one or more repeatability attributes.

Figure 1A:
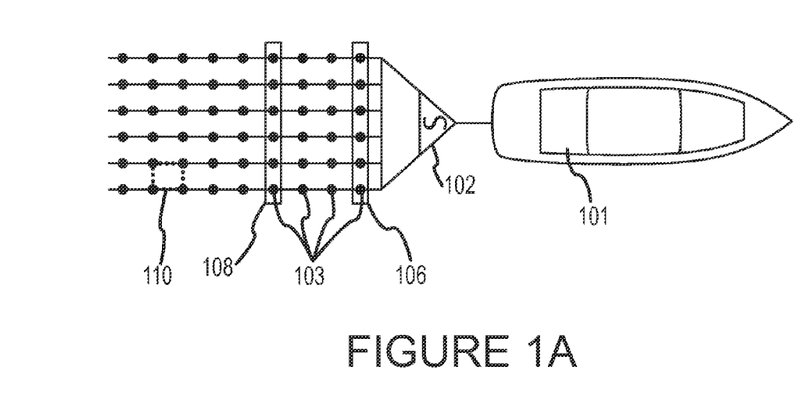
FIG. 1A illustrates a top view of a vessel towing a seismic source and a plurality of seismic receivers positioned on streamers towed behind the vessel.
Figure 1B:
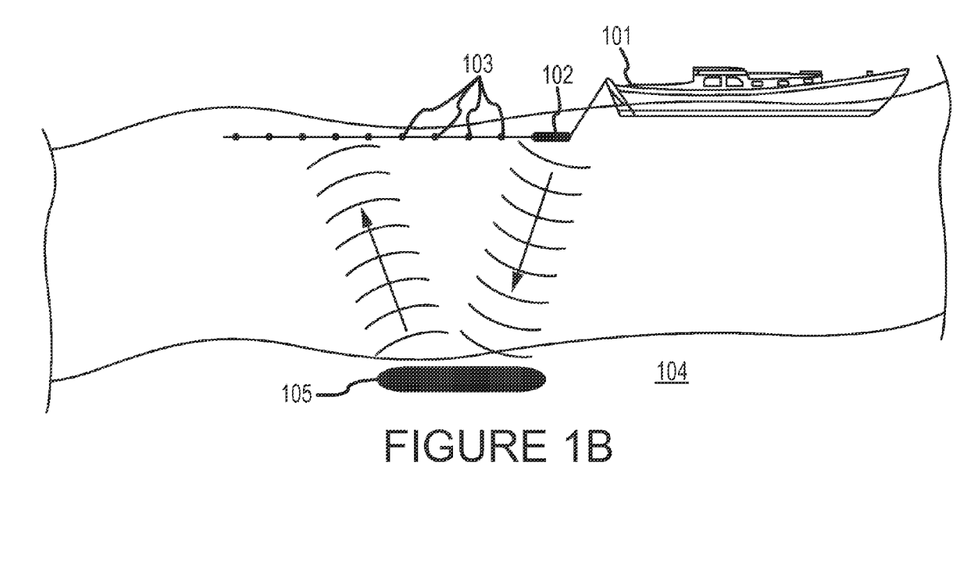
FIG. 1B illustrates a side view of the vessel of FIG. 1A.

FIG. 1A shows a top view of a vessel 101 towing a source 102 and several receivers 103 on streamers behind the vessel 101. FIG. 1B shows a side-view of the vessel 101 shown in FIG. 1A with the source 102 and receivers 103 being towed behind the vessel 101 just beneath the surface of the water. For the sake of discussion, the embodiment depicted in FIGS. 1A and 1B illustrates the source and receiver being towed by the same vessel, however, other possible combinations are possible. For example, in other embodiments, either the source and/or receivers may be towed by separate vessels or may be implemented in land-based acquisition systems. In still other embodiments, the source and/or receivers may be stationary while the other is towed behind the vessel. In yet other embodiments, the receivers 103 may be positioned deeper in the water, for example, by using streamer steering devices, such as the DigiFIN® brand steering device available from ION Geophysical, Inc. In other embodiments, multiple sources may be used. Also, any type of source(s) or receiver(s) may be used, including for example, 1-, 2-, or 3-dimensional sources or receivers.

During operation, the source 102 may emit seismic energy (e.g., through an air gun), which may reflect off various portions of the Earth 104 and may be received back at the receivers 103 (as shown by the propagating seismic waves in FIG. 1B). The signal received and processed at the receivers 103 may provide data that is useful in determining the composition of various portions of the Earth 104 proximate the location where the signal was reflected, which may include an oil and/or gas reservoir 105. If the amount of oil and/or gas in the reservoir 105 is depleted over time, then subsequent surveys conducted in substantially the same location as the first survey may indicate various properties of this depletion such as: decreasing pore pressures, migration of oil/water and/or gas/water contacts, drop in impedance, and so forth.

FIGS. 2A through 2D illustrate operations 200 that may utilize a predetermined metric or attribute as a criteria for binning coverage. Although any metric, or even multiple metrics, may be used as a filter to bin coverage, for the sake of discussion, the following disclosure illustrates the operations 200 in the context of using a repeatability metric as a filter. For example, some embodiments of operations 200 may include binning a CMP if a repeatability attribute for that CMP falls within a specified range. Also, the operations 200 may analyze data from the full offset range (i.e. data from every offset step, with an offset step being one or more receiver intervals) or data from a subset of the full offset range (such as only one offset step from within each offset zone, or only one offset zone within the full offset range).

Figure 2A:
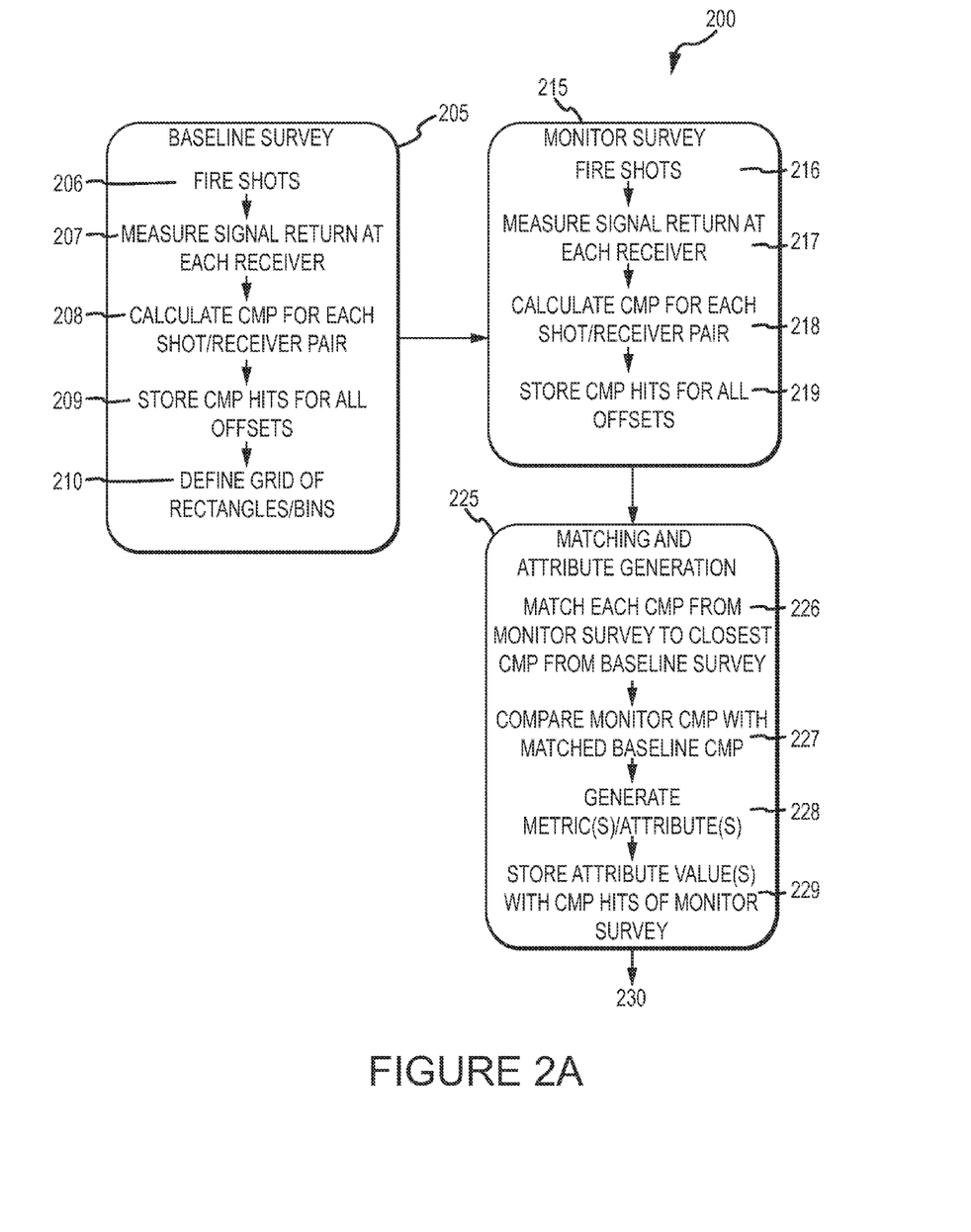
FIGS. 2A through 2D illustrate a system and method of using one or more attribute value(s) as criteria for binning or filtering coverage.

Operations 200 will now be discussed in conjunction with the survey operations illustrated in FIGS. 1A and 1B. In FIG. 2A, Operation 205 illustrates the sub-operations 206-210 associated with conducting a baseline survey. In general, during the baseline survey, a seismic source may fire shots or bursts of seismic energy into the Earth 104 in sub-operation 206. This energy reflects back and is received and measured as a signal at a receiver at a specific offset at sub-operation 207, with the offset being, in some embodiments, the radial range from the source to a specific receiver or group of receivers. In some embodiments, there may be several receivers at each offset and/or multiple offsets as indicated by boxes 106 and 108 in FIG. 1A, in which each box contains several receivers and each box is located at a different offset.

For each source 102—receiver 103 pair, operation 205 may include sub-operations 208 and 209 that include calculating and storing CMPs at each offset step. This is illustrated in FIG. 1A with box 106 indicating a first offset where each of the receivers in the box 106 has a different CMP vis-à-vis the source 102. Sub-operation 209 may also store related context information with each CMP, including, for example acquisition and/or seismic attributes such as source ID, receiver ID, source position, receiver position, time, water depth, vessel speed, offset, azimuth, and so forth. Likewise, each of the receivers 103 in box 108 (which are at a different offset than the receivers in box 106), may have a different CMP. Operation 205 may in some embodiments also include sub-operation 210 where a grid of rectangles referred to as "bins" may be defined. Note that although the bins are illustrated in operation 205 as the final sub-operation, they may be defined at any point in the baseline survey. The width of a bin may be substantially the same as the spacing between CMP lines and the height of a bin may be substantially the same as the spacing between CMPs on a single CMP line. This is illustrated in FIG. 1A with a bin 110 indicated by a dashed box. Of course, bins of other dimensions also may be defined with different heights or widths, depending on the resolution required.

After the baseline survey is complete, a visual representation of the baseline survey may be generated after "binning" each CMP by associating data from each source receiver pair with the bin where its CMP is located (this operation is not shown in FIGS. 2A through 2D). A visual representation may be a spatial coverage plot (similar to the plot shown FIG. 3) or any other representation that conveys coverage information, such as charts, lists, graphs, and so forth. Within each bin, there may be CMPs for different receiver offset steps. If a bin has at least one CMP from each offset step, it may be referred to as "full fold." In other words, full fold coverage is achieved by obtaining a complete distribution of source to receiver offset steps over the entire offset range. Each bin may include, for example a count of how many CMPs are present at each offset step, or how "full" the fold is. Each bin may additionally or alternatively include a percentage of how full the fold is. In some cases, there may be more than one CMP per offset step, referred to as "duplicates," and these duplicates may be included or excluded during binning.

After a predetermined amount of time has elapsed, a monitor survey may be conducted, as shown in operation 215. In some embodiments, the amount of time that elapses between the baseline and monitor surveys is one or more years. The monitor survey in operation 215, along with its sub-operations 216-219, may be similar to the baseline survey: seismic shots may be fired in sub-operation 216, seismic energy may be reflected off the Earth and be received at one or more receiver(s) in sub-operation 217, the signal may be recorded, a CMP calculated for each source receiver pair in sub-operation 218, and the CMP for each offset may be stored in sub-operation 219. Then, similar to the binning and generating a visual representation of coverage described above, the baseline survey CMPs may be binned and a visual representation of the coverage of the monitor survey may be generated (this operation is not shown in FIGS. 2A through 2D). Each bin may include, for example, a count of how many CMPs are present at each offset, or any other useful information. FIG. 3 illustrates an unfiltered coverage plot for the monitor survey that may result from the sub-operations of operation 215. Referring to FIG. 3, the x and y axes of FIG. 3 represent a bin grid, as defined in operation 205. The shading in of each rectangular region represents how "full" that particular bin is, as shown in the key at the bottom of FIG. 3. For example, bins that are white are 61% or more full. The shading scale can be configured to be any type of shading, including different colors and so forth. Likewise, the thresholds in the key and plot can be set to any percentage range; they may also be set to display the actual fold value rather than a percentage, or any other useful information.

Returning to FIG. 2A, instead of generating an unfiltered coverage plot (like that shown in FIG. 3), flow may proceed to operation 225 where data from the monitor survey may be matched to data from the baseline survey and one or more metrics may be generated. The sub-operations of operation 225 may include first, for each CMP of each shot fired in the monitor survey, determining a CMP from the baseline survey that is the "closest match" in sub-operation 226. In some embodiments, this match may be based upon the closest geometric match. One example of geometric closeness may be measured by the geometric repeatability value Dsrc+Drx. Dsrc is the difference in source positions between the baseline survey CMP and the monitor survey CMP at the time of firing the seismic source respectively. Likewise, Drx is the difference in the receiver positions between the baseline survey CMP and the monitor survey CMP at the time of firing the seismic source. In some embodiments, the positions of the source and/or receiver may be with reference to a navigation system aboard the vessel 101, such as by using a Global Positioning System (GPS). Dsrc+Drx represents the sum of these two differences. Evaluating Dsrc+Drx values in order to determine the closest CMP match may ensure that the same azimuth of data is obtained so as to be referencing substantially the same area of the subsurface, which may allow, for example, the characteristics of the reservoir 105 to be consistently characterized over time.

In the embodiments that utilize the repeatability metric Dsrc+Drx value to find a closest CMP match, all non-unique CMP hits from both monitor and baseline survey data may be analyzed to find a minimal Dsrc+Drx value for each bin. Some embodiments may perform this analysis at a single offset step while other embodiments may perform this analysis on multiple offset steps of interest. Furthermore, this analysis may involve exchanging the source and receiver positions in an effort to obtain different Dsrc+Drx values; this exchanging process is termed "reciprocity."

After each CMP in the monitor survey has been matched to a CMP in the baseline survey, the matched pairs of CMPs may be compared again in sub-operation 227 in order to generate an attribute value in sub-operation 228, and those attribute values may be stored with the CMP hits of the monitor survey in sub-operation 229. The attribute value may be called a repeatability metric, or a repeatability attribute, if it represents a comparison between a baseline survey CMP and a monitor survey CMP; repeatability referring to how well the monitor survey 'repeated' the baseline survey. Accordingly, each CMP in the monitor survey may be individually characterized according to how it matches any one or more CMP(s) in the baseline survey.

Figure 2B:
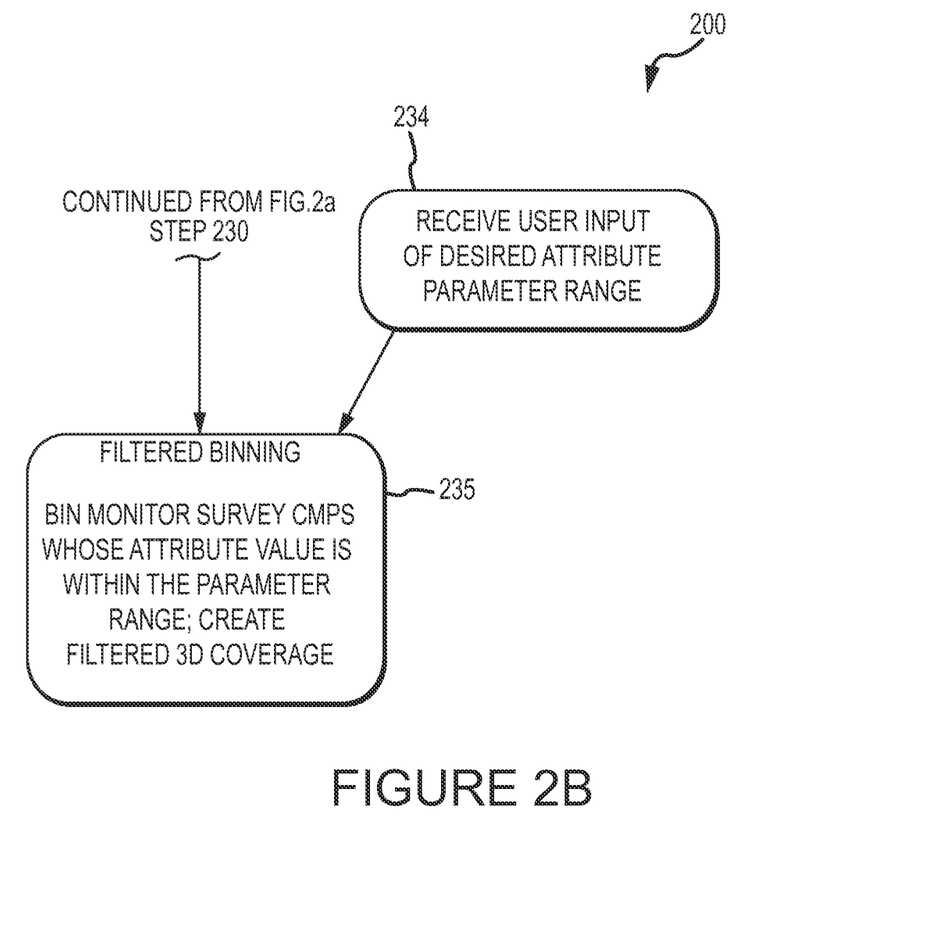
Figure 3:
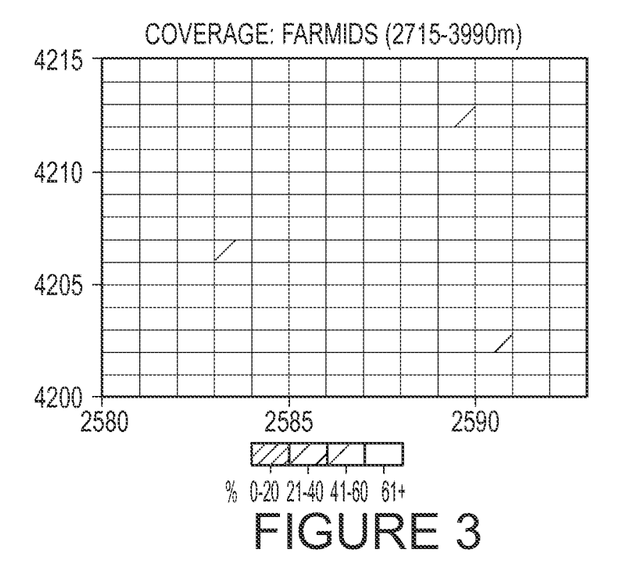
FIG. 3 is an unfiltered spatial coverage plot.
Figure 4:
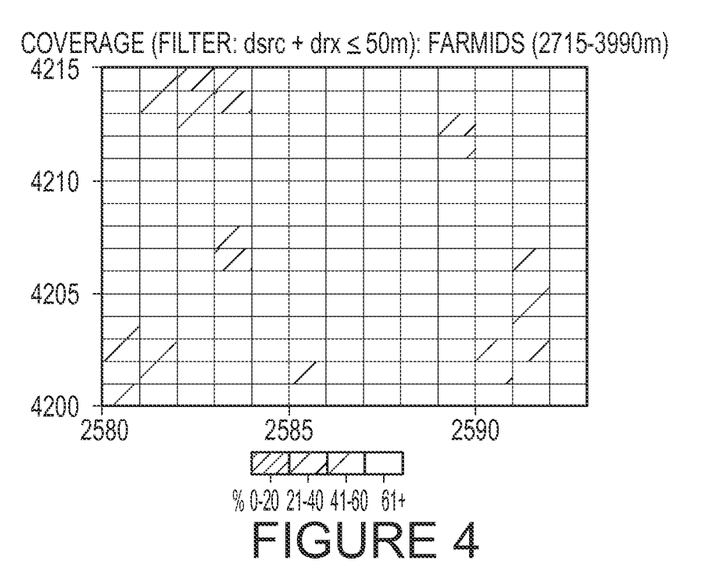
FIG. 4 illustrates a spatial coverage plot filtered according to one embodiment.

Next, as shown in FIG. 2B, flow may proceed from operation 225 (via 230) to operation 235 where the CMP hits of the monitor survey from operation 215, the associated attribute values determined in operation 225, and a user specified attribute parameter range or ranges (received in operation 234) all may be used to selectively bin the monitor survey data. In this manner, the monitor survey may be filtered such that only those CMPs whose attribute value is within the specified parameter range remain in the binned monitor survey data. FIG. 4 illustrates a sample filtered coverage visual representation with the filter being Dsrc+Drx less than or equal to 50 meters. Referring to FIG. 4 in conjunction with FIG. 3, the x and y axes of FIG. 4 are the same as FIG. 3, and represent the same area of the bin grid. Again, the shading of each rectangular region represents how "full" that particular bin is, with any CMPs whose Dsrc+Drx is greater than 50 meters being excluded. Hence, several bins that are 61% or more full in FIG. 3 are significantly less full in FIG. 4 after the filter has been applied.

It should be appreciated that that FIGS. 3 and 4 only show coverage for the far-mid source receiver offsets, however, the operations 200 may be used to create a coverage plot (or attribute plot) over any desired offset range. Also, as mentioned above, instead of just one user specified attribute parameter range, several different attributes may be combined, allowing the creation of several different filters or one compound filter. For example, a user may only want CMP hits with Dsrc+Drx being less than 50 meters and only hits that are from a certain receiver or streamer, or only hits from a certain offset or offset range. Alternatively, a user may desire to create a filtered plot that only shows bins that have a certain percentage (e.g., 90%) of CMP hits with Dsrc+Drx less than 50 meters. Any of several different attribute value ranges may be used alone or in combination with one or more other attribute values filtering the data during binning. Furthermore, any range of attribute values may be used, including by selecting only data above a certain range, below a certain range, or within an upper and lower bound.

Figure 2C:
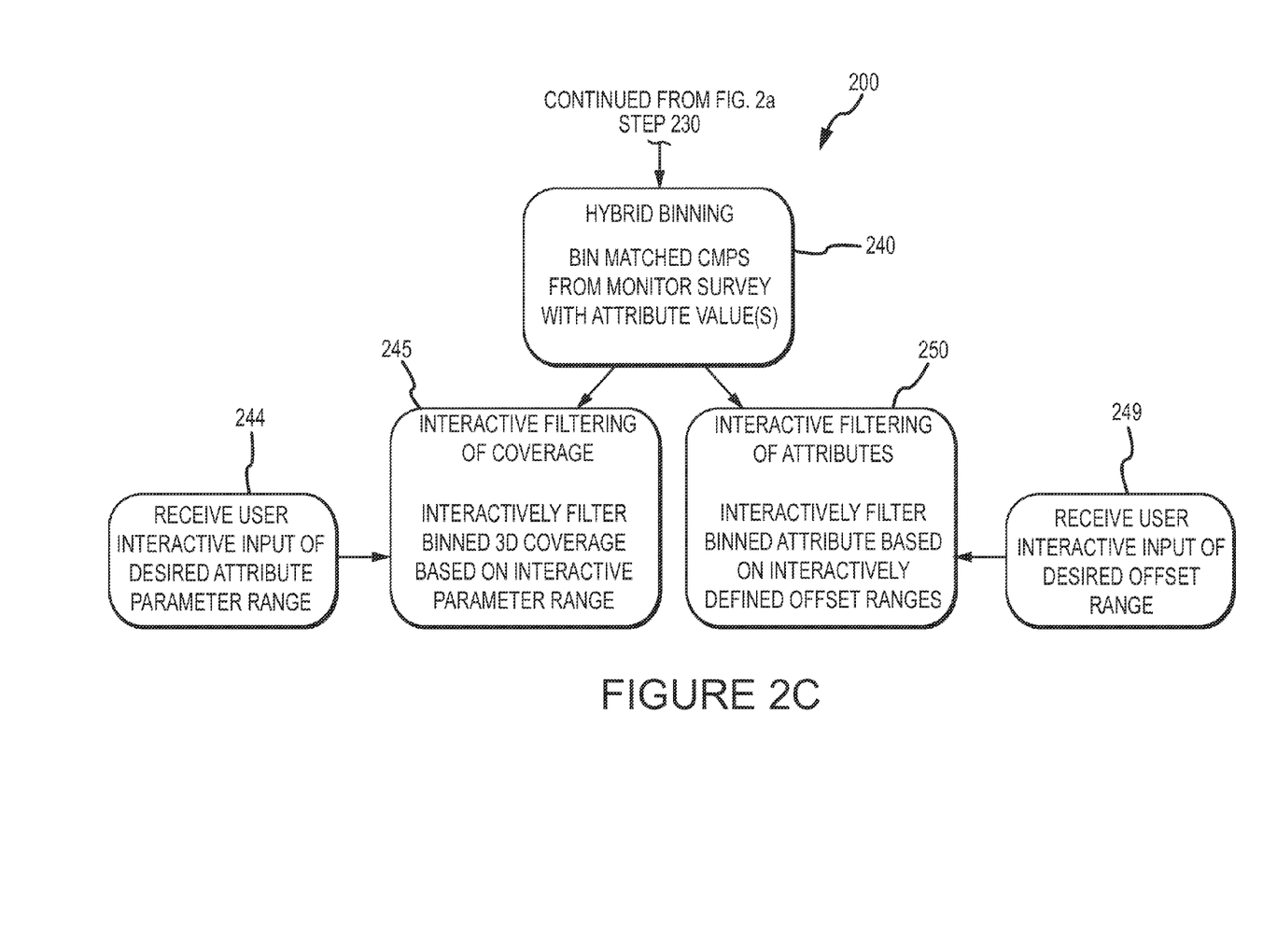

Referring now to FIG. 2C, flow may alternatively proceed from operation 225 (via 230) to operation 240. In operation 240, rather than generating a static, filtered 3D coverage of the monitor survey that can be viewed by a user (as is done in operation 235), the hybrid binning of operation 240 prepares data such that a user may later interactively filter coverage, or interactively create other visual representations based on data obtained during the monitor survey. In hybrid binning, each matched CMP from the monitor survey may be binned together with its attribute value (as opposed to operation 235, where only CMPs falling within a user input range are binned without their attribute value). The matched CMP hit may be binned with its attribute value by appending the attribute value to the file or files containing the information for each binned CMP. The output of operation 240 may allow a user to either interactively filter coverage, as shown in operation 245, or to interactively filter attributes, as shown in operation 250, because, as mentioned, the attribute values upon which filtering will be done are stored with the binned CMPs for every source receiver pair in the monitor survey. Note that operation 240 may proceed generally from any survey and attribute generation, and is not limited to repeatability attributes.

As described above, following hybrid binning in operation 240, flow may proceed to operation 245. Here, a user may interactively input a desired attribute parameter range (for example, a maximum Dsrc+Drx value) and filter the 3D binned coverage by only including those CMPs whose attribute values are within the input parameter range. A user may be able to interactively change the parameters, received in operation 244, and thereby specify how the data is combined. In other words, a user may be able to change the filtering criteria. So, for example, a user may initially specify that Dsrc+Drx be less than 50 meters, and view the binned 3D coverage that has been filtered based on that specification. Immediately following that, the user may be able to change the input to Dsrc+Drx being less than 25 meters. Without re-binning, the system 200 may be able to filter the coverage and visually display the binned 3D coverage filtered with the new input. Note that, as discussed above in connection with operation 235, a coverage plot may be created over any desired offset range (such as, for example, Dsrc+Drx being less than 50 meters but greater than 25 meters) and also, two or more user specified attributes may be combined, which may allow the creation of several different filters and/or one compound filter.

Figure 5A:
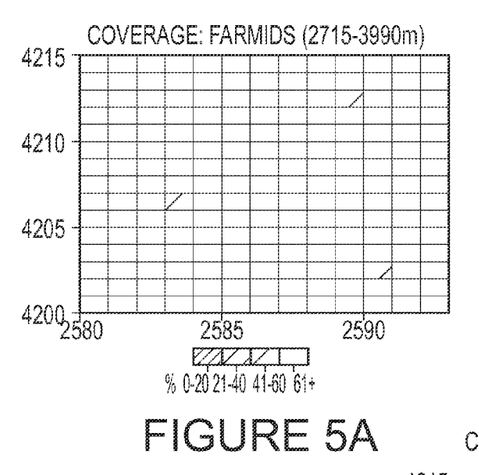
FIGS. 5A through 5C illustrate spatial coverage plots that may be generated by interactively filtering coverage using one or more attribute value(s) as criteria.
Figure 5B:
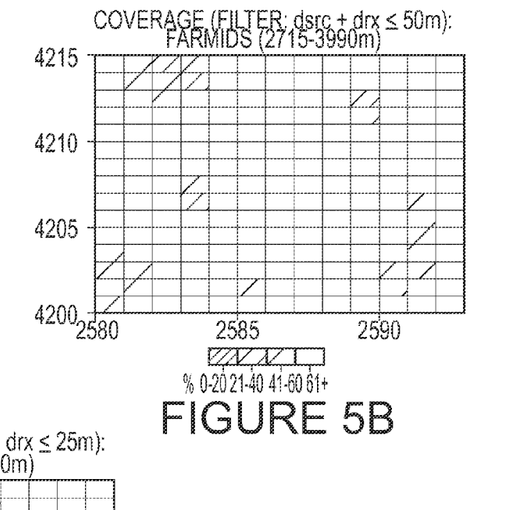
Figure 5C:
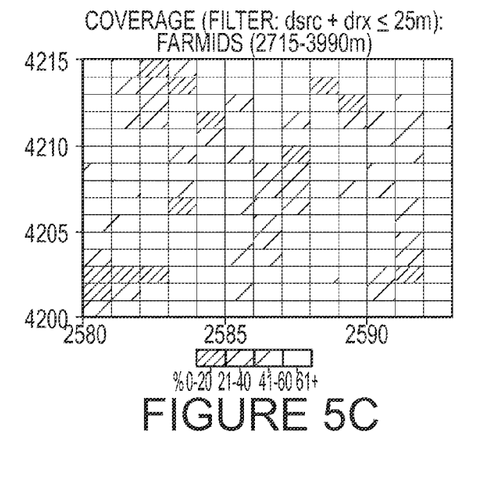

FIGS. 5A through 5C illustrate one possible set of images that may be output from operation 245. Specifically, FIG. 5A shows an unfiltered coverage plot, FIG. 5B shows a coverage plot filtered with Dsrc+Drx less than 50 meters, and FIG. 5C shows a coverage plot filtered with Dsrc+Drx less than 25 meters. Note that FIG. 5 shows coverage plots for the far-mid offset range. Also note that, as mentioned above, many other filters may be applied, such as, for example a filter of Dsrc+Drcx being less than 50 meters but greater than 25 meters.

Figure 6:
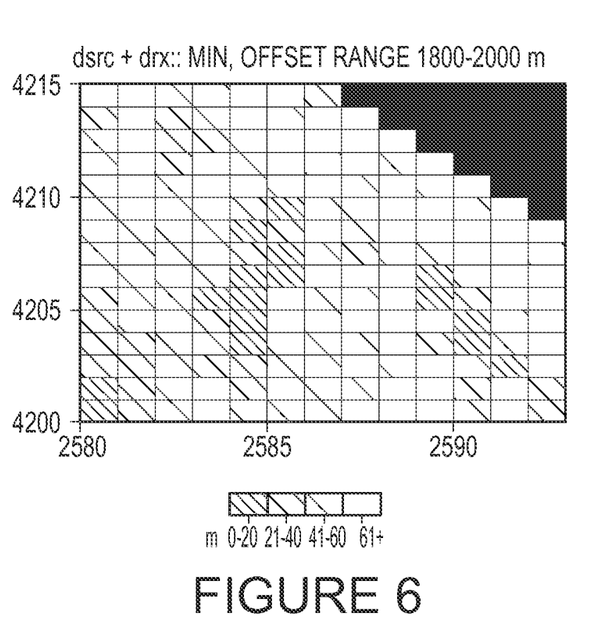
FIG. 6 illustrates a spatial attribute plot filtered according to another embodiment.

Also, instead of proceeding to operation 245 following operation 240, flow may proceed to operation 250. There, a user can interactively input a desired offset range (received in operation 249), and view, instead of coverage, an attribute plot showing only attribute values from CMPs within the specified offset range. A user may be able to specify that the plot show the minimum attribute value for each bin, the mean attribute value for each bin, the maximum attribute value for each bin, and so forth. If multiple attribute values were binned with the CMPs, a user may also be able to specify which attribute value to show for each bin. FIG. 6 illustrates an attribute plot showing the minimum value of Dsrc+Drx within each of the bins for the 1800-2000 m offset range. This plot is generally similar to the plots illustrated in FIGS. 3, 4, and 5A through 5C, except instead of showing coverage (in percentage points), the plot in FIG. 6 shows attribute values, in this case the minimum Dsrc+Drx value for each min specified in meters.

Figure 2D:
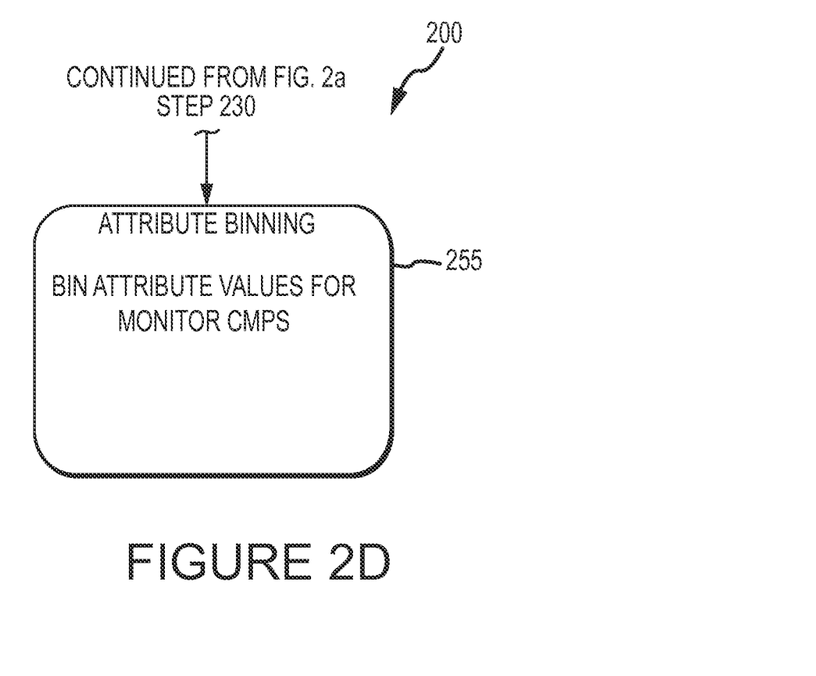

Referring now to FIG. 2D, flow may alternately proceed from operation 225 (via 230) to operation 255, attribute binning. Here, attribute data may be binned for monitor survey CMPs at a few offset steps (typically 3 or 4). The output of this operation is a plot showing, for each bin, the value associated with that bin representing how "good" the repeatability was for one of the selected offset steps.

While the above discussion has specifically mentioned the use of repeatability attributes such as Dsrc+Drx for filtering, numerous CMP-based or shot-based attributes may be used for filtering including repeatability attributes, acquisition attributes, seismic attributes, and so forth. Repeatability attributes may include geometric values such as Dsrc (difference in source positions for the baseline and monitor surveys, which has radial, inline, and crossline components), Drx (difference in receiver positions for the baseline and monitor surveys, which also has radial, inline, and crossline components), Dcmp (difference in CMP positions for the baseline and monitor surveys), Doffset (difference in the radial offset from source to receiver for the baseline and monitor surveys), Dazimuth (difference in azimuth, the bearing from source to receiver), Dsrc+Drx (the combined difference of the source and receiver positions for the baseline and monitor surveys), Dcdp (the difference in the CDP positions for the baseline and monitor surveys, which has radial, inline, and crossline components), and so forth. Repeatability attributes also may include seismic values, such as static and dRMS (the difference in Root Mean Square amplitude between the monitor and baseline surveys) values, and so forth. Other attributes that may be used for filtering coverage include seismic attributes (such as RMS, signal to noise ratio, and so forth) and acquisition attributes (such as water depth, streamer or receiver depth, feather, streamer separation, vessel speed, offset, azimuth, source ID, receiver ID, streamer ID, time, and so forth). If, for example, receiver ID is used as a filter, it may be possible to view the effect on coverage of removing one or more receivers interactively (such as while the survey is being conducted, or after the survey is complete while reviewing the data). Any of these attributes may be used alone or in combination with one another, in either filtered binning or hybrid binning, as described above. The operations 200 described above may be implemented using various combinations of hardware and/or software.

Figure 7:
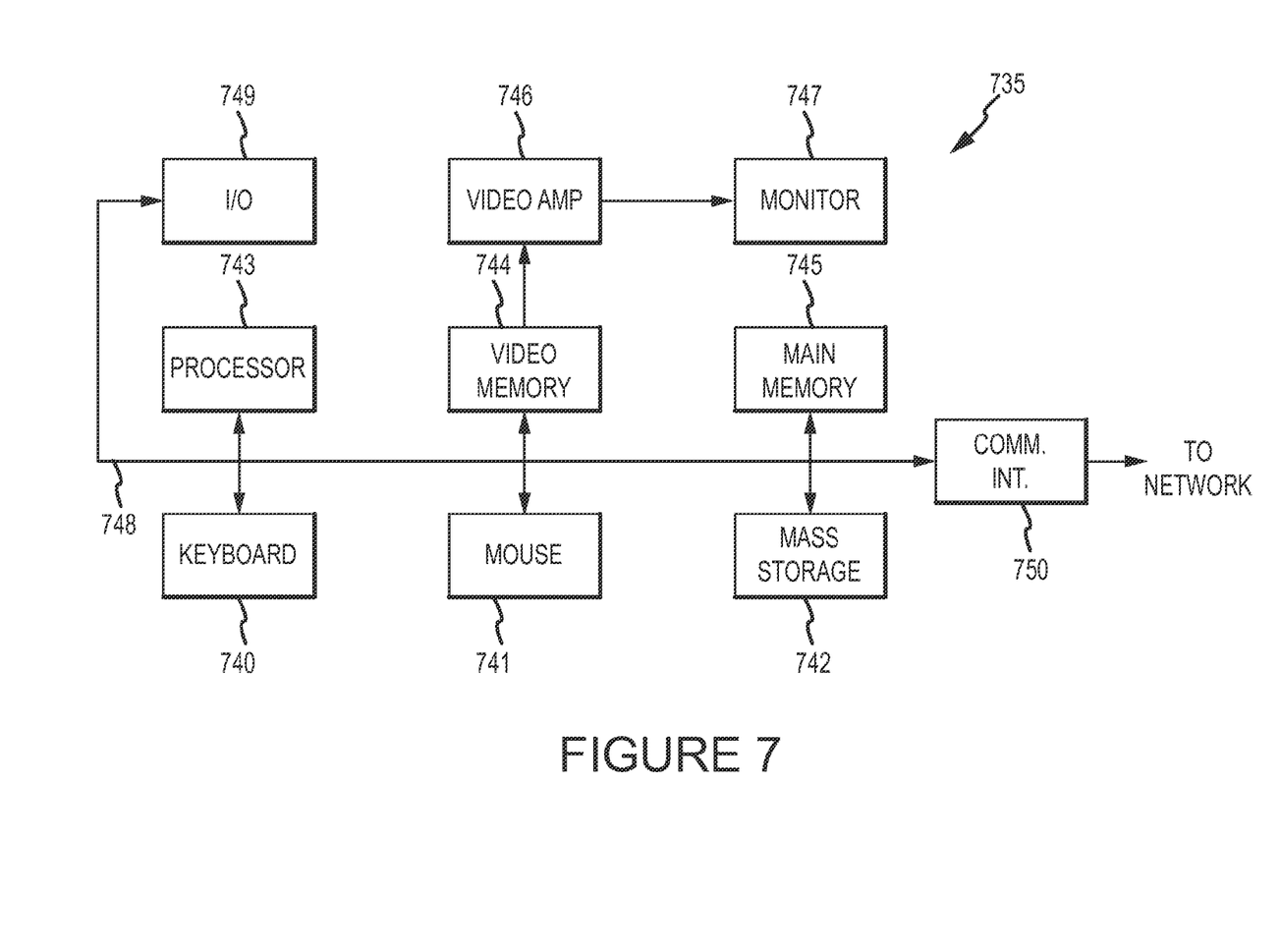
FIG. 7 illustrates an embodiment of a computer system capable of storing and/or processing navigation and seismic data, such as to produce images according to the operations in FIGS. 2A through 2D.

FIG. 7 illustrates an embodiment of the computer system 735 capable of storing and/or processing navigation and seismic data, such as to produce images according to the operations 200. In some embodiments, the computer system 735 may be a personal computer and/or a handheld electronic device aboard the vessel 101 (shown in FIGS. 1A and 1B). In other embodiments, the computer system 735 may be an implementation of enterprise level computers, such as one or more blade-type servers within an enterprise in a land-based computer system. A keyboard 740 and mouse 741 may be coupled to the computer system 735 via a system bus 748. The keyboard 740 and the mouse 741, in one example, may introduce user input to the computer system 735 and communicate that user input to a processor 743. Other suitable input devices may be used in addition to, or in place of, the mouse 741 and the keyboard 740. An input/output unit 749 (I/O) coupled to the system bus 748 represents such I/O elements as a printer, audio/video (NV) I/O, etc.

Computer 735 also may include a video memory 744, a main memory 745 and a mass storage 742, all coupled to the system bus 748 along with the keyboard 740, the mouse 741 and the processor 743. The mass storage 742 may include both fixed and removable media, such as magnetic, optical or magnetic optical storage systems and any other available mass storage technology. The bus 748 may contain, for example, address lines for addressing the video memory 744 or the main memory 745.

The system bus 748 also may include a data bus for transferring data between and among the components, such as the processor 743, the main memory 745, the video memory 744 and the mass storage 742. The video memory 744 may be a dual-ported video random access memory. One port of the video memory 744, in one example, is coupled to a video amplifier 746, which is used to drive a monitor 747. The monitor 747 may be any type of monitor suitable for displaying graphic images, such as a cathode ray tube monitor (CRT), flat panel, or liquid crystal display (LCD) monitor or any other suitable data presentation device.

The computer system includes a processor 743, which may be any suitable microprocessor or microcomputer. The computer system 735 also may include a communication interface 750 coupled to the bus 748. The communication interface 750 provides a two-way data communication coupling via a network link. For example, the communication interface 750 may be a satellite link, a local area network (LAN) card, a cable modem, and/or wireless interface. In any such implementation, the communication interface 750 sends and receives electrical, electromagnetic or optical signals that carry digital data streams representing various types of information.

Code received by the computer system 735 may be executed by the processor 743 as the code is received, and/or stored in the mass storage 742, or other non-volatile storage for later execution. In this manner, the computer system 735 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices. Regardless of the actual implementation of the computer system 735, the data processing system may execute operations that allow for the filtering using repeatability and other metrics.

What is claimed is:

1. A method of processing geophysical data, the method comprising the acts of:
correlating a first set of the data from a monitor survey with a second set of the data from a baseline survey, wherein the monitor survey occurs after the baseline survey;
generating an attribute value for each datum in the first set of data,
wherein the attribute value includes a repeatability metric that measures how geometrically close the first set of data from the monitor survey is to the second set of data from the baseline survey, and
wherein the repeatability metric comprises differences in source and receiver positions for the baseline and monitor surveys, each of which has radial, inline and crossline components, the repeatability metric comprising $D_{src}+D_{rx}$, in which $D_{src}$ is the difference in source positions between the baseline survey common midpoint (CMP) position and the monitor survey common CMP at a time of firing a seismic source, and $D_{rx}$ is the difference in receiver positions between the baseline survey CMP and the monitor survey CMP at the time of firing the seismic source;
associating each datum within the first set of data with the generated attribute value and at least one of a plurality of bins defined in the baseline survey; and
outputting a value associated with each bin, based on the repeatability metric.

2. The method of claim 1, wherein the act of generating occurs at substantially the same time as the act of correlating and/or the act of associating.

3. The method of claim 1, wherein each of the plurality of bins corresponds to a predefined boundary within a spatial grid, a width of each bin being substantially the same as a spacing between common mid-point position (CMP) lines in the baseline survey and a height of each bin being substantially the same as a spacing between CMPs on a single one of the CMP lines.

4. The method of claim 1, further comprising filtering the first set of data based on the attribute value associated with each datum of the first set of data and generating a visual representation of the filtered data, including only data whose associated attribute value lies within a specified range of attribute values.

5. The method of claim 4, wherein the filtering occurs on an interactive basis and further comprising receiving the specified range from a user.

6. The method of claim 1, wherein each datum within the first set of data comprises an offset and further comprising filtering the first set of data based on the offset associated with each datum and including only data whose offset lies within a specified range of offsets.

7. The method of claim 1, where the first and second sets of data comprise common mid-point positions (CMPs) between the sources and the receivers and each bin includes a count of CMPs at different offset steps.

8. The method of claim 7, wherein the first and second sets of data also comprise context information for each CMP including the source and/or receiver positions.

9. The method of claim 1, wherein a difference between the first and second sets of data represents a depletion in petrochemical content over a period of time between the baseline and monitor survey.

10. The method of claim 7, wherein the act of associating comprises binning, wherein the repeatability metric is used as a filter to include the CMPs if the repeatability metric falls within a specified range.

11. The method of claim 1, wherein the geophysical data are acquired by observing reflected seismic signals detected by seismic receivers during the surveys.

12. The method of claim 1, wherein the geometric value is based on differences in the source and receiver positions for the baseline and monitor surveys.

13. The method of claim 12, further comprising exchanging the source and receiver positions to obtain a different geometric value for the repeatability metric.

14. A non-transitory, tangible storage medium for storing a plurality of instructions, the instructions executable by a computer processor to perform the steps of:
   correlating a first set of seismic data acquired from reflected seismic signals in a monitor survey with a second set of seismic data acquired from reflected seismic signals in a baseline survey, wherein the monitor survey occurs after the baseline survey;
   generating an attribute value for each datum in the first set of data,
      wherein the attribute values include a repeatability metric that measures how geometrically close the first set of data from the monitor survey is to the second set of data from the baseline survey, and
      wherein the repeatability metric comprises differences in source and receiver positions for the baseline and monitor surveys, each of which has radial, inline and crossline components, the repeatability metric comprising $D_{src}+D_{rx}$, in which $D_{src}$ is the difference in source positions between the baseline survey common midpoint (CMP) position and the monitor survey common CMP at a time of firing a seismic source, and $D_{rx}$ is the difference in receiver positions between the baseline survey CMP and the monitor survey CMP at the time of firing the seismic source;
   associating each datum within the first set of data with at least one of the generated attribute values and at least one of a plurality of bins defined in the baseline survey; and
   outputting a value associated with each bin, based on the repeatability metrics.

15. The non-transitory, tangible storage medium of claim 14, wherein the associating step comprises storing each datum within the first set of data with the generated attribute value and with identifying information for the at least one of the plurality of bins.

16. The non-transitory, tangible storage medium of claim 14, the steps further comprising:
   filtering the first set of data based on the attribute value associated with each datum of the first set of data; and
   generating a visual representation of the filtered data.

17. The non-transitory, tangible storage medium of claim 16, wherein the filtering occurs on an interactive basis to create other visual representations based on the data from the monitor survey.

18. A system comprising:
   memory for storing seismic data acquired by observing reflected seismic signals detected in monitor and baseline surveys;
   a processor configured for:
      correlating a first set of the data acquired from the monitor survey with a second set of the data acquired from the baseline survey, wherein the monitor survey occurs after the baseline survey;
      generating attribute values for each datum in the first set of data, wherein the attribute values include a repeatability metric that measures how geometrically close the first set of data from the monitor survey is to the second set of data from the baseline survey, and
      wherein the repeatability metric comprises differences in source and receiver positions for the baseline and monitor surveys, each of which has radial, inline and crossline components, the repeatability metric comprising $D_{src}+D_{rx}$, in which $D_{src}$ is the difference in source positions between the baseline survey common midpoint (CMP) position and the monitor survey common CMP at a time of firing a seismic source, and $D_{rx}$ is the difference in receiver positions between the baseline survey CMP and the monitor survey CMP at the time of firing the seismic source; and
      associating the data within the first set of data with the generated attribute values and a plurality of bins defined in the baseline survey; and
   a display configured for outputting values associated with each bin, based on the repeatability metrics.

19. The system of claim 18, wherein the geometric values comprises differences in the source and receiver positions including radial, inline and crossline components, and further comprising exchanging the source and receiver positions to obtain different geometric values for the repeatability metrics.

* * * * *